(12) United States Patent
Ma et al.

(10) Patent No.: US 9,980,543 B2
(45) Date of Patent: May 29, 2018

(54) PROTECTIVE CASE FOR A DEVICE

(71) Applicant: HEWLETT-PACKARD DEVELOPMENT COMPANY, L.P., Houston, TX (US)

(72) Inventors: Xiang Ma, Houston, TX (US); Carla Ali-Napo, Houston, TX (US); Kyle Robert Thornton, Houston, TX (US); Rudy Widiaman, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/304,935

(22) PCT Filed: Apr. 30, 2014

(86) PCT No.: PCT/US2014/036189
§ 371 (c)(1),
(2) Date: Oct. 18, 2016

(87) PCT Pub. No.: WO2015/167536
PCT Pub. Date: Nov. 5, 2015

(65) Prior Publication Data
US 2017/0196327 A1 Jul. 13, 2017

(51) Int. Cl.
*A45C 11/00* (2006.01)
*A45C 13/10* (2006.01)
(Continued)

(52) U.S. Cl.
CPC .......... *A45C 11/00* (2013.01); *A45C 13/1069* (2013.01); *A45F 5/10* (2013.01); *G06F 1/1626* (2013.01); *G06F 1/1628* (2013.01); *G06K 7/0021* (2013.01); *H01R 24/62* (2013.01); *H04B 1/3888* (2013.01); *A45C 2011/002* (2013.01); *A45C 2011/003* (2013.01); *A45C 2011/188* (2013.01); *H01R 2107/00* (2013.01); *H04B 1/3818* (2015.01)

(58) Field of Classification Search
None
See application file for complete search history.

(56) References Cited

U.S. PATENT DOCUMENTS 7,440,286 B2 10/2008 Hiew et al.
7,651,346 B2 1/2010 Francis et al.
(Continued)

FOREIGN PATENT DOCUMENTS

CN 201072558 6/2008
CN 201251930 6/2009
(Continued)

OTHER PUBLICATIONS

Simon Mackay, "Product Review-brother MFC-J4710DW Colour Multifunction Inkjet Printer," Jul. 23, 2013, http://homenetworking01.info/tags/t-37-fax-over-email.

*Primary Examiner* — Kristy A Haupt
(74) *Attorney, Agent, or Firm* — HPI Patent Department (57) ABSTRACT

A protective case for a portable computing device in accordance with one example includes a cavity in the case to be a plurality of electronic devices. The cavity includes a first recess to receive a first electronic device and a second recess to receive a second electronic device. The case also includes a cover removably coupled to the cavity.

17 Claims, 6 Drawing Sheets

(51) Int. Cl.
*A45F 5/10* (2006.01)
*G06F 1/16* (2006.01)
*G06K 7/00* (2006.01)
*H01R 24/62* (2011.01)
*H04B 1/3888* (2015.01)
*A45C 11/18* (2006.01)
*H01R 107/00* (2006.01)
*H04B 1/3818* (2015.01)

(56) References Cited

U.S. PATENT DOCUMENTS

| | | | |
|---|---|---|---|
| 8,149,424 B2 | 4/2012 | Yomogida et al. | |
| 8,463,335 B2 * | 6/2013 | Yang | H01M 2/1066 348/14.02 |
| 2007/0032122 A1 | 2/2007 | Wang | |
| 2012/0103855 A1 | 5/2012 | Gaddis, II et al. | |
| 2012/0154119 A1 * | 6/2012 | Schepps | G08B 21/24 340/10.1 |
| 2014/0251368 A1 * | 9/2014 | Lawson | A45C 11/00 132/287 |
| 2014/0364176 A1 * | 12/2014 | Pintor | H04B 1/385 455/575.6 |
| 2015/0102073 A1 * | 4/2015 | Pusateri | H04B 1/3888 224/191 |

FOREIGN PATENT DOCUMENTS

| | | |
|---|---|---|
| CN | 101931670 | 12/2010 |
| CN | 202103291 | 1/2012 |
| CN | 103635422 | 3/2014 |
| KR | 20110076747 | 7/2011 |
| KR | 10-2012-0074680 A | 7/2012 |
| KR | 20-2013-0000487 U | 1/2013 |
| KR | 20130000487 | 1/2013 |
| KR | 200470353 Y1 | 12/2013 |
| KR | 10-1386854 | 4/2014 |
| KR | 101386854 B1 | 4/2014 |
| WO | WO-2011081448 | 10/2011 |
| WO | WO-2013132203 A1 | 9/2013 |

* cited by examiner

PROTECTIVE CASE FOR A DEVICE

BACKGROUND

The emergence and popularity a mobile computing has made portable computing devices a staple in today's marketplace, due to their compact design and light weight. Tablet computers are examples of portable computing devices that are widely used. Tablet computers generally employ a touchscreen on a display surface of the tablet that may be used for both viewing and input. Users of tables may interact with the touchscreen via finger or stylus gestures. As an example, an on-screen keyboard may be illustrated on the touchscreen surface for entering characters.

BRIEF DESCRIPTION OF THE DRAWINGS

Some examples of the present application are described with respect to the following figures.

DETAILED DESCRIPTION

While using a portable computing device such as a tablet computer (or any other computing device), it may be desirable to protect the tablet computer via a protective case, such that the tablet computer is suitable for tough environments, for example. As an example, the protective case may prevent damage to the tablet computer from accidental drops and other external environmental conditions such as water, dirt, and debris. The protective case may be used to cover various portions of the tablet computer, such as the display surface and/or the back surface opposite the display surface and the sidewalls of the tablet computer.

In addition to protecting the tablet computer, it may be desirable to expand the functionalities of the tablet computer, for example, by providing expansion slots for electronic devices such as a smart card or a universal serial bus (USB) device in the protective case. One of the challenge encountered with existing protective cases (e.g., ruggedized jackets) is the ability to protect electronic devices (e.g., smart card and USB) attached to the tablet computer and the tablet computer from external environment. For example, a USB device may be sticking out of the tablet computer (or exposed) via the protective case while in use, thereby causing damage to both the USB dongle and the tablet computer when dropped or hit by external objects. In addition, size restrictions on tablet computers make it difficult to provide multiple ports for multiple electronic devices.

Examples disclosed herein address the above challenges by providing a protective case for a computing device. The protective case includes a cavity to receive a plurality of electronic devices and a cover removable coupled to the cavity to seal the cavity and to protect the electronic devices from external factors.

In one example, a protective case for a portable computing device includes a cavity in the case to house a plurality of electronic devices. The cavity includes a first recess to receive a first electronic device and a second recess to receive a second electronic device. The case also includes a cover removable coupled to the cavity.

In another example, a protective case for enclosing a back surface and sidewalls of a portable computing device includes a cavity in the case to house a plurality of electronic devices. The cavity includes a first recess to receive a first electronic device, where the first recess includes a first connector to connect the first electronic device to the computing device. The cavity also includes a second recess to receive a second electronic device, where the second recess includes a second connector to connect the second electronic device to the computing device. The case also includes a cover removably coupled to the cavity, where the cover rotates to unlock the cover from the case.

In yet another example, a system includes a portable computing device including a display surface and a back surface opposite the display surface. The system includes a protective case for enclosing the back surface and sidewalls of the device. The case includes a cavity in the case to house a plurality of electronic devices. The cavity includes a first recess to receive a first electronic device, where the first recess includes a first connector to connect the first electronic device to the computing device. The cavity also includes a second recess to receive a second electronic device, where the second recess includes a second connector to connect the second electronic device to the computing device. The case includes a cover removably coupled to the cavity.

Figure 1:
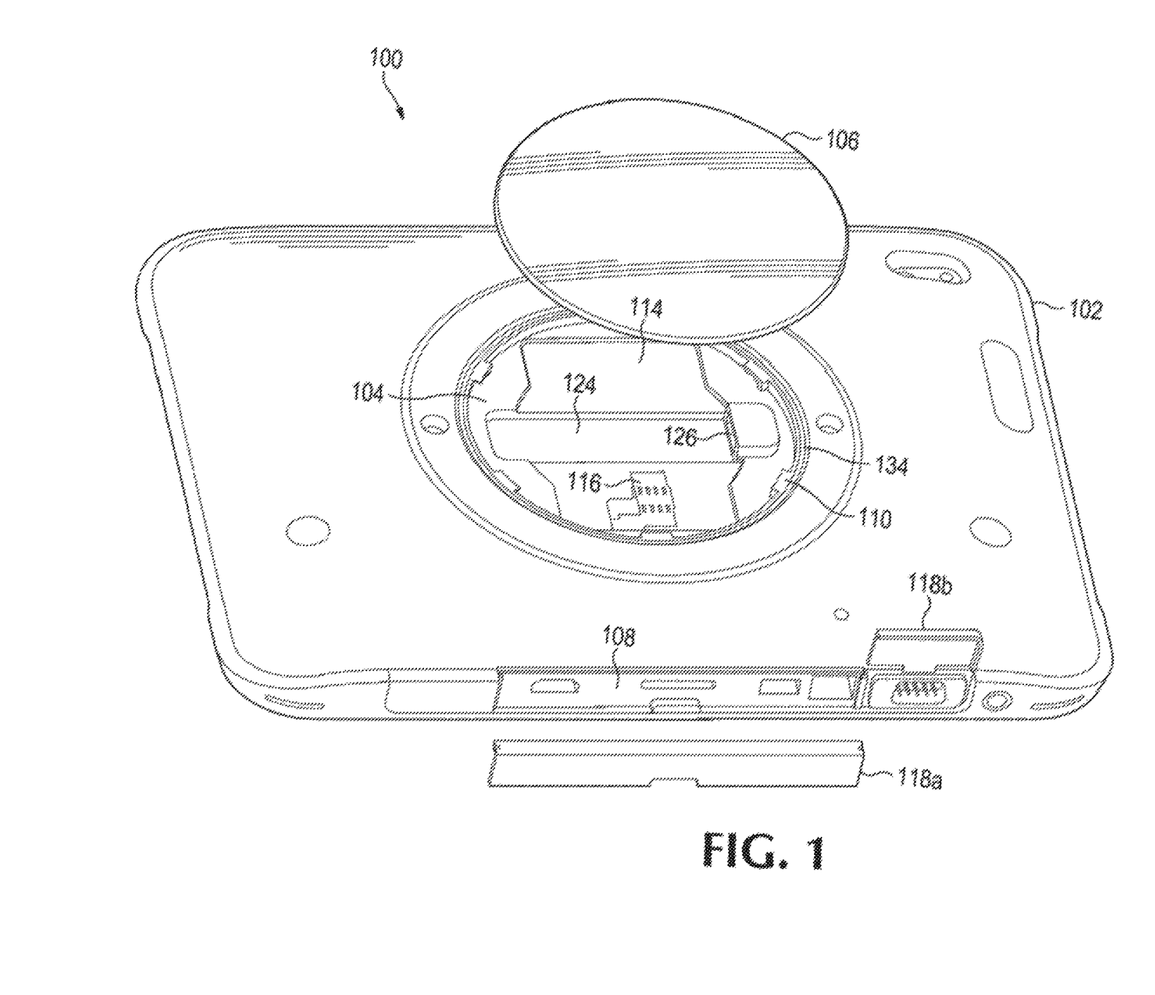
FIG. 1 illustrates a protective case for a portable computing device, according to an example.

Referring now to the figures, FIG. 1 illustrates a protective case for a portable computing device, according to an example. Computing device 100 can be a tablet computer, for example. However, computing device 100 can be any portable computing device such as a laptop computer, a notebook computer, a mobile device (e.g., a smartphone), "phablet" device (i.e., phone/tablet device), a hybrid computer, or any other portable computing device.

Device 100 can include a back surface opposite a display surface. In between the display surface and the back surface, the device 100 may include sidewalls around a perimeter of the device 100. As an example, the device 100 may include four (4) sidewalls (e.g., a left sidewall, a right sidewall, a top sidewall, and a bottom sidewall 108). Device 100 can be fitted with a case 102 for enclosing at least the back surface and sidewalls. For example, a portion of the bottom sidewall 108 may be exposed via at least one of a removable cover 118a and a hinged cover 118b of the case 102. The exposed portion of the sidewall 108 may include ports and/or connectors of the device 100 such as USB, HDMI, power, etc.

In addition to protecting device 100, case 102 can expand the functionalities of device 100. For example, case 102 includes a cavity 104 to house a plurality of electronic devices, and a cover 106 to protect the electronic devices in the cavity 104 from external environment. Cavity 104 includes a first recess 114 to receive a first electronic device and a second recess 124 to receive a second electronic device. In certain examples, the first electronic device includes a smart card and the second electronic device includes a universal serial bus (USB) dongle.

The first recess 114 includes a smartcard reader 116 to connect to the smart card. The smartcard reader 116 can be located at one end of the first recess 114 with the electronic contacts of the smartcard reader 116 facing upwards to make contact with the smartcard. The second recess 124 includes a USB connector 126 (e.g., a USB host connector/port or a USB female connector/port) to connect to the USB dongle. The USB connector 126 can be located at one end of the second recess 124. The smart card reader 116 and the USB connector 126 can be connected to a printed circuit board (PCB) of the device 100, where the PCB (not shown) is located inside the device 100. In certain examples, the first recess 114 and the second recess 124 are arranged such that either one of the smart card and the USB dongle can be used at one time.

In certain examples, cavity 104 is a round-shaped cavity. However, cavity 104 can be any shape. In some examples, an edge of the cavity 104 can include an O-ring 134 or molded with soft material such as silicon rubber to protect the cavity 104 from external factors such as water and dust.

Cover 106 can be removably coupled to the cavity 104. For example, cover 106 can be magnetically coupled to the cavity 104 or mechanically coupled to the cavity 104. For example, cavity 104 can include L-shaped locking features 110 that removably couple with corresponding L-shaped locking features within the cover 106. Alternately, or in addition, cavity 104 can include magnetic members that removably couple with magnetic members disposed within the cover 106. Cover 106 can be dome-shaped such that the cover 106 accommodates the shape and length of the USB dongle while maintaining sufficient pressure on the smart card to enable contact with the smart card reader 116 and provide a good read of the smart card.

Figure 2A:
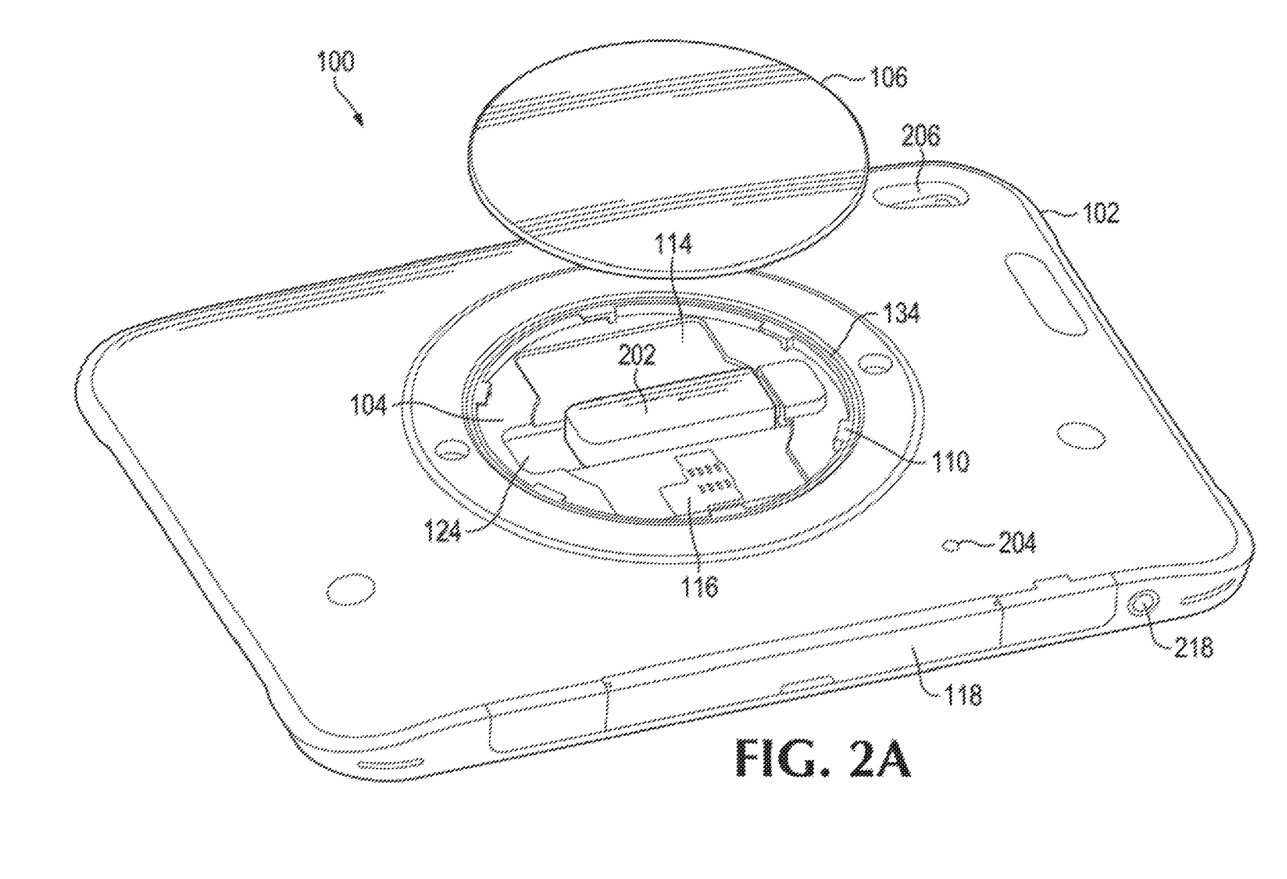
FIGS. 2A-B illustrate the protective case including an electronic device, according to an example.
Figure 2B:
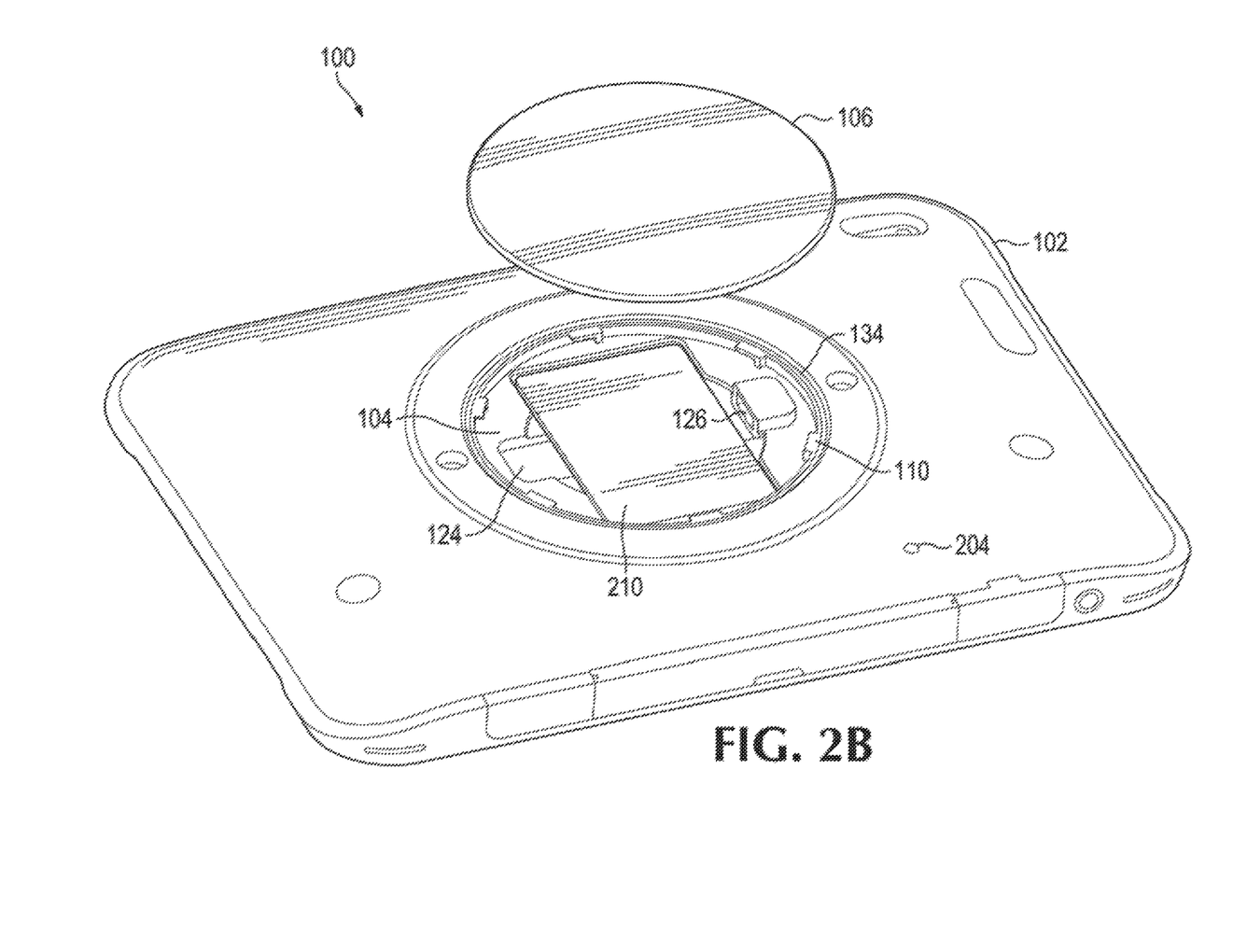

FIGS. 2A-B illustrate the protective case including an electronic device, according to an example. In FIG. 2A, a USB dongle 202 is connected to the device 100. In particular, USB dongle 202 is located in second recess 124 of the cavity 104, and is connected to the USB connector 126. Because the USB dongle 202 is in the cavity 104, a smart card may not be used simultaneously within the cavity 104.

In FIG. 2B, a smart card 210 is connected to the device 100. In particular the smart card 210 is located in first recess 114 of the cavity 104, and is connected to the smart card reader 116. Because the smart card 210 is in the cavity 104, the USB dongle 202 may not be used simultaneously in the cavity 104.

Case 102 can further include a light emitting diode (LED) 204 to indicate that one of the USB dongle 202 and a smart card 210 is present in the cavity. In some examples, the LED 204 may display a first color to indicate that the USB dongle 202 is in use or present in the cavity 104 and a second color to indicate that the smart card 210 is in use or present in the cavity 104. Case 102 can include one or more openings to reveal a rear facing camera 206 and an earphone port 218 of the device 100.

Figure 3A:
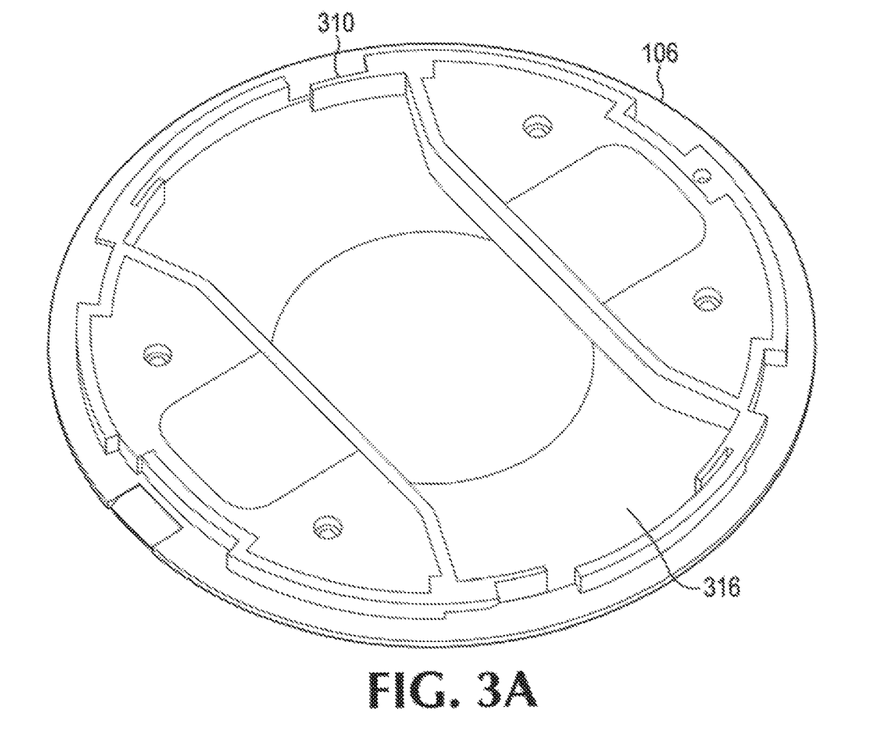
FIGS. 3A-B illustrate a cover of the protective case, according to an example.
Figure 3B:
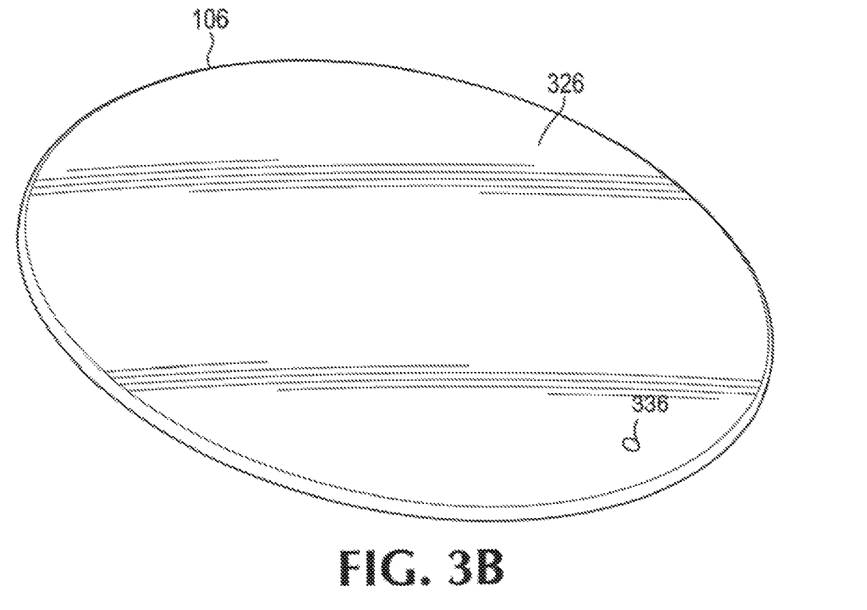

FIGS. 3A-B illustrate a cover of the protective case, according to an example. Cover 106 can be dome shaped or bulged such that the cover 106 accommodates the shape and length of the USB dongle 202 while maintaining sufficient pressure on the smart card 210 to provide contact with the smart card reader 116.

FIG. 3A illustrates an inner portion 316 of the cover 106. The inner portion 316 is the portion facing the electronic devices 202 and 210, and is thus concave. The inner portion 316 of the cover 106 can include L-shaped locking features 310 to removably couple with corresponding L-shaped locking features of the cavity 104. To illustrate, the L-shaped locking features 310 of the cover 106 can rotate to lock or unlock the cover 106 from the cavity 104. Alternatively, or in addition, cover 106 can include magnets (not shown) disposed therein to removably couple with magnets disposed within the cavity 104.

FIG. 3B illustrates an outer portion 326 of the cover (e.g., convex). In certain examples, the cover 106 includes an LED 336 on the outer portion 326. The LED can indicate when the USB dongle 202 or the smart card 210 is in use or inserted into the cavity 104. In some examples, the LED 336 can display a different color when the USB dongle 202 is in use and when the smart card 210 is in use. In other examples, the cover 106 is transparent such that a user can see through the outer portion 326 if one of the USB dongle 202 and the smart card 210 is in the cavity 104.

Figure 4:
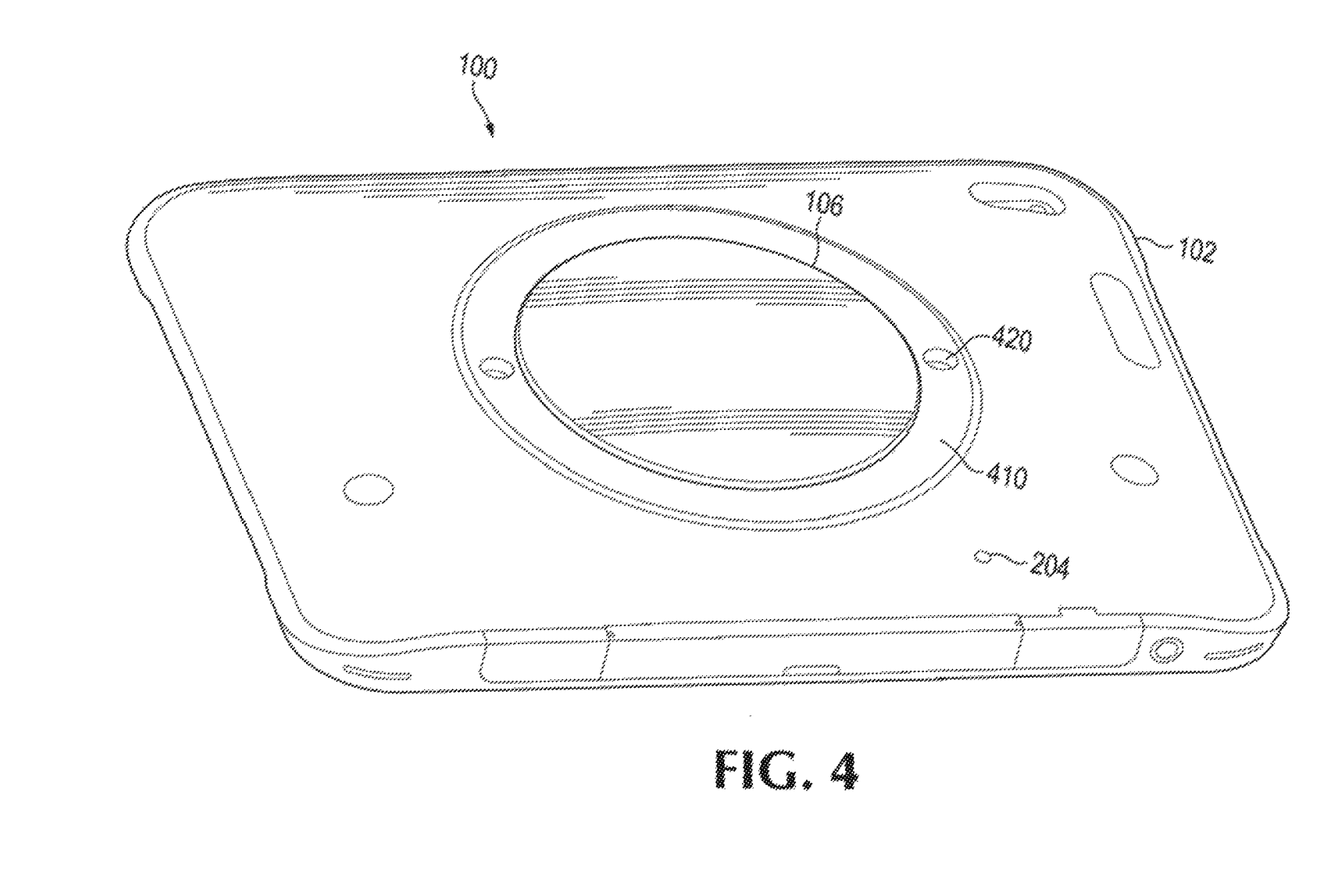
FIG. 4 illustrates the protective case including the cover coupled to a cavity of the case, according to an example.

FIG. 4 illustrates the protective case including the cover coupled to the cavity of the case, according to an example. In the example of FIG. 4, the cover 106 coupled to the cavity 104 to protect electronic devices 202 and 210 in the cavity from external environment such as water and dust. Accordingly, cover 106 can seal the cavity 104 from water and dust, for example while providing expanded functionality for the device 100. In the example of FIG. 4, the case 102 can include two openings 420 on a surface portion of the case 102 for attaching a strap (not shown). The strap can be useable for holding the device 100. Further, the surface portion 410 can rotate (for example via the strap) to change an orientation of the device 100.

Figure 5:
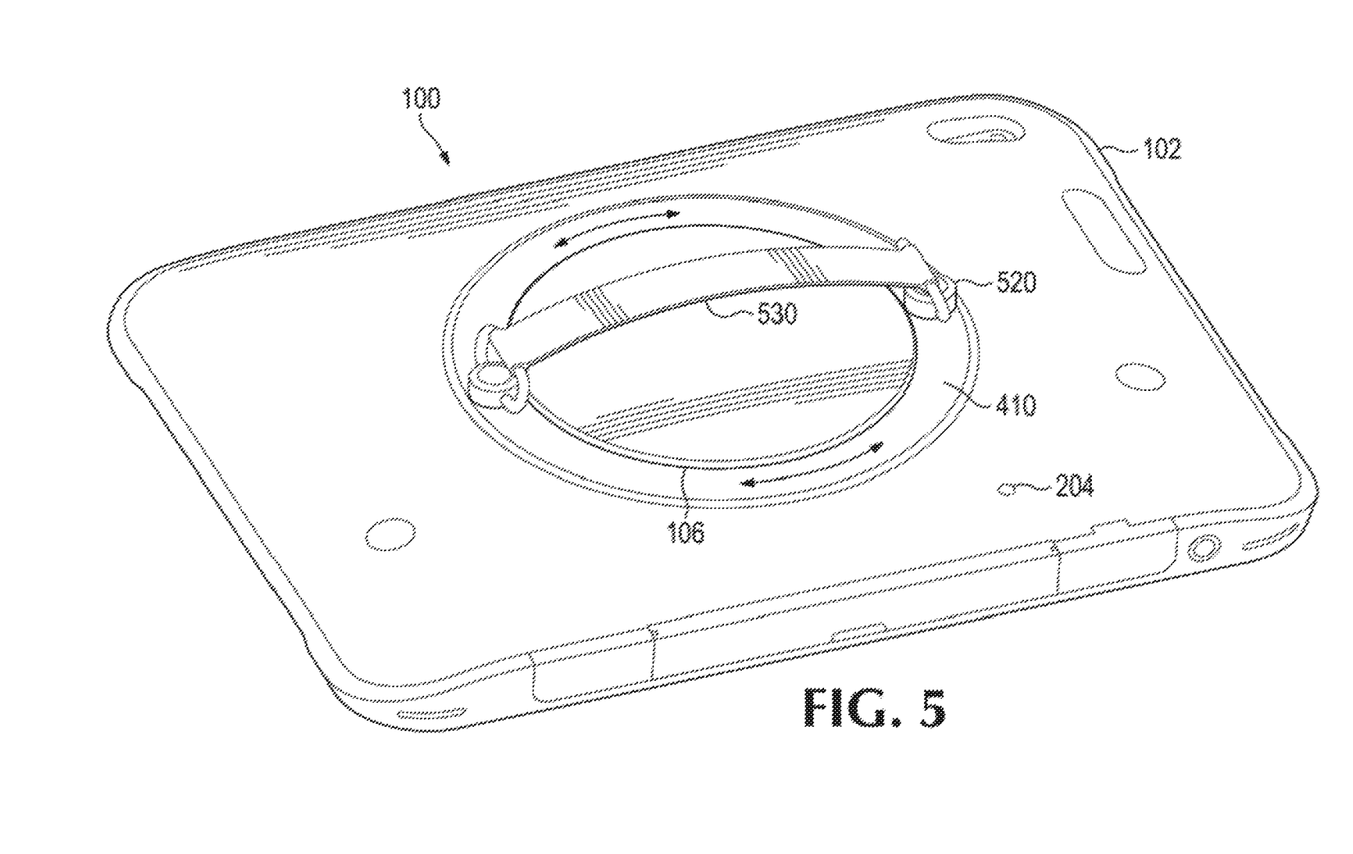
FIG. 5 illustrates the protective case including a strap attached to a surface portion of the case for holding the device, according to an example.

FIG. 5 illustrates the protective case including a strap across an outer surface portion of the case for holding and rotating the device, according to an example. In the example of FIG. 5, a strap 530 can be inserted into the two openings 420 on the outer surface portion 410 of the case 102. The surface portion 410 can rotate clockwise and counter-clockwise to change an orientation of the device. Accordingly, a user can hold the device via the strap 530 and rotate the device 100 during use, for comfort and convenience.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A protective case for a portable computing device, the case comprising:
   a cavity in the case to house a plurality of electronic devices, the cavity including:
      a first recess to receive a first electronic device, and
      a second recess to receive a second electronic device, wherein the second recess is located across the first recess such that either one of the first electronic device and the second electronic device can be used at one time; and
   a cover removably coupled to the cavity.

2. The protective case of claim 1, wherein the cavity is a round cavity and wherein an edge of the round cavity includes at least one of an O-ring and a round-shaped silicon rubber to protect the cavity from external environment.

3. The protective case of claim 1, wherein the first electronic device includes a smart card and wherein the second electronic device includes a universal serial bus (USB) dongle.

4. The protective case of claim 3, wherein the first recess includes a smart card reader to connect to the smart card and wherein the second recess includes a USB connector to connect with the USB dongle.

5. The protective case of claim 4, wherein the smart card reader and the USB connector are connected to a printed circuit board (PCB) of the portable computing device.

6. The protective case of claim 5, wherein the PCB is located inside the protective case.

7. The protective case of claim 4, wherein the cover is dome shaped such that the cover accommodates a shape and length of the USB dongle while maintaining sufficient pressure on the smart card to provide contact with the smart card reader when the smart card is used.

8. The protective case of claim 4, wherein the smart card reader is located at one end of the first recess, wherein an electronic contact of the smart card reader is in the direction of the smart card to contact the smart card.

9. The protective case of claim 8, wherein the USB connector is located at one end of the second recess, wherein an electronic contact of the USB connector is in the direction of the USB dongle to contact the USB dongle.

10. The protective case of claim 1, wherein the cavity includes first L-shaped locking features to removably couple with second L-shaped locking features of the cover.

11. The protective case of claim 1, wherein the cavity includes first magnetic members to magnetically couple with second magnetic members disposed within the cover.

12. The protective case of claim 11, wherein the first connector includes a smart card reader to connect to a smart card,
wherein the second connector includes a universal serial bus (USB) connector to connect to a USB dongle, and
wherein the smart card reader and the USB connector are connected to a printed circuit board assembly (PCBA) of the portable computing device.

13. A protective case for enclosing a back surface and sidewalls of a portable computing device, the case comprising:
a cavity in the case to house a plurality of electronic devices, the cavity including:
a first recess to receive a first electronic device, wherein the first recess includes a first connector to connect the first electronic device to the portable computing device; and
a second recess to receive a second electronic device, wherein the second recess includes a second connector to connect the second electronic device to the portable computing device, wherein the second recess is located across the first recess such that either one of the first electronic device and the second electronic device can be used at one time; and
a cover removably coupled to the cavity, wherein the cover rotates to unlock the cover from the case.

14. The protective case of claim 13, wherein the case includes a light emitting diode (LED) to indicate that one of the smart card and the USB connector is present in the cavity.

15. The protective case of claim 13, wherein the case includes two openings on a surface portion of the case to attach a strap to hold the portable computing device, and wherein the surface portion is rotatable to change an orientation of the portable computing device.

16. A system comprising:
a portable computing device including a display surface and a back surface opposite the display surface; and
a protective case for enclosing the back surface and sidewalls of the portable computing device, wherein the case includes:
a cavity in the case to house a plurality of electronic devices, the cavity including:
a first recess to receive a first electronic device, wherein the first recess includes a first connector to connect the first electronic device to the portable computing device; and
a second recess to receive a second electronic device, wherein the second recess includes a second connector to connect the second electronic device to the portable computing device, wherein the second recess is located across the first recess such that either one of the first electronic device and the second electronic device can be used at one time; and
a cover removably coupled to the cavity.

17. The system of claim 16, wherein the first connector includes a smart card reading module to connect to a smart card,
wherein the second connector includes a universal serial bus (USB) connector to connect to a USB device,
wherein the smart card reading module and the UBS connector are connected to a printed circuit board assembly (PCBA) of the portable computing device, and
wherein a middle portion of the cover is transparent to show a presence of the smart card or the USB device in the cavity.

* * * * *

UNITED STATES PATENT AND TRADEMARK OFFICE
CERTIFICATE OF CORRECTION

PATENT NO. : 9,980,543 B2
APPLICATION NO. : 15/304935
DATED : May 29, 2018
INVENTOR(S) : Xiang Ma et al.

Page 1 of 1

It is certified that error appears in the above-identified patent and that said Letters Patent is hereby corrected as shown below:

On the Title Page

In Column 2, item (57), Abstract, Line 2, delete "be" and insert -- house --, therefor.

In the Claims

In Column 6, Line 39 to 40 approx., Claim 17, delete "UBS" and insert -- USB --.

Signed and Sealed this
Ninth Day of October, 2018

Andrei Iancu
*Director of the United States Patent and Trademark Office*